United States Patent
Li et al.

(10) Patent No.: US 7,649,024 B2
(45) Date of Patent: Jan. 19, 2010

(54) PROCESS FOR PREPARING NANOFLUIDS WITH ROTATING PACKED BED REACTOR

(75) Inventors: Chia-Chen Li, Hsinchu (TW); Mu-Jen Young, Hsinchu (TW); Ruey-Fu Shih, Hsinchu (TW); Ming-Chang Wen, Hsinchu (TW); Meu-Hui Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 874 days.

(21) Appl. No.: 11/221,811

(22) Filed: Sep. 9, 2005

(65) Prior Publication Data
US 2006/0247322 A1    Nov. 2, 2006

(30) Foreign Application Priority Data
Dec. 15, 2004 (TW) ............................. 93138946 A

(51) Int. Cl.
*B01F 3/12* (2006.01)
*C10M 169/04* (2006.01)

(52) U.S. Cl. ............... 516/33; 516/924; 508/165; 508/171; 508/172; 508/178; 977/773; 977/786; 977/787

(58) Field of Classification Search ................. 516/33, 516/924; 252/73, 74; 508/136, 165, 171, 508/172, 178; 977/773, 786, 787
See application file for complete search history.

(56) References Cited

U.S. PATENT DOCUMENTS

| | | | | |
|---|---|---|---|---|
| 4,283,255 A * | 8/1981 | Ramshaw et al. | ............. | 203/49 |
| 4,382,045 A * | 5/1983 | Wem | ............. | 261/89 |
| 4,382,900 A * | 5/1983 | Wem | ............. | 261/89 |
| 4,400,275 A * | 8/1983 | Ramshaw et al. | ............. | 210/321.68 |
| 7,166,260 B2 * | 1/2007 | Shih et al. | ............. | 422/215 |
| 7,361,621 B2 * | 4/2008 | Yang et al. | ............. | 502/103 |
| 2005/0019248 A1 * | 1/2005 | Chen et al. | ............. | 423/598 |
| 2005/0186133 A1 * | 8/2005 | Chen et al. | ............. | 423/598 |
| 2005/0209097 A1 * | 9/2005 | Yang et al. | ............. | 502/172 |

OTHER PUBLICATIONS

Derwent Abstract on East, week 200455, London: Derwent Publications Ltd., AN 1997-436179, CN 1036766 C, (Univ Beijing Chem Eng), abstract.*

(Continued)

*Primary Examiner*—Daniel S Metzmaier
(74) *Attorney, Agent, or Firm*—Bacon & Thomas, PLLC

(57) ABSTRACT

The present invention discloses a process for preparing a hydrophobic fluid containing metal oxide nanoparticles dispersed therein such as heat transfer fluids or lubricant fluids, including introducing an alkaline aqueous solution (aqueous phase) and an organic solution of an organic acid metal salt (hydrophobic phase) into a rotating packed bed, the two solutions flowing radially through the rotating packed bed under a great centrifugal force, so that the aqueous phase and the hydrophobic phase contact with each other, reactants in the two phases undergo reactions at the interface of the two phases rapidly, and thus metal oxide nanoparticles are formed. The metal oxide nanoparticles stably dispersed in the hydrophobic phase, which is nanofluid.

17 Claims, 2 Drawing Sheets

OTHER PUBLICATIONS

Derwent Abstract on East, week 200456, London: Derwent Publications Ltd., AN 1997-436214, CN 1038578 C, (Univ Beijing Chem Eng), abstract.*

Derwent Abstract on East, week 200525, London: Derwent Publications Ltd., AN 2000-579781, CN 1092145 C, (Univ Beijing Chem Eng), abstract.*

Derwent Abstract on East, week 200612, London: Derwent Publications Ltd., AN 1997-436191, CN 1116146 A, (Univ Beijing Chem Eng), abstract.*

Derwent Abstract on East, week 200544, London: Derwent Publications Ltd., AN 2001-390678, CN 1288856 A, (Univ Beijing Chem Eng), abstract.*

* cited by examiner

PROCESS FOR PREPARING NANOFLUIDS WITH ROTATING PACKED BED REACTOR

FIELD OF THE INVENTION

The present invention is related to a process for preparing an oily fluid having metal oxide nanoparticles dispersed therein, such as heat transfer fluids and lubricant oils.

BACKGROUND OF THE INVENTION

Nanofluid is a new working fluid, which can be prepared by blending a small amount (<5%) of nanoparticles into a conventional working fluid, for examples a heat transfer fluid used in the heat radiator, engine, refrigeration or air conditioning systems, and a lubricant oil. The working properties of the nanofluid such as the heat transfer ability and anti-friction coefficient are improved, which can be used as a heat transfer nanofluid or a nano-lubricant oil. The conventional processes for preparing the nanofluid can be classified into two types: one is the one-step method, and the other is the multi-step method. The one-step method at the present utilizes the physic vapor formation, wherein nanoparticles are formed in a sealed reactor under a high vacuum and an elevated temperature, and are introduced into a working fluid; or directly forming nanoparticles in an aqueous phase fluid by arc discharge. The advantages of the one-step method are lesser agglomerates of the nanoparticles and better dispersion of the nanoparticles in the nanofluid. However, there are disadvantages of the one-step method which are difficulty in the control of the nanoparticle composition and the rate of forming the nanoparticles being too slow for mass production. The multi-step method involves obtaining nanoparticles and dispersing the nanoparticles into a fluid. Advantageously, versatile fluids and nanoparticles can be used in the multi-step method. Further, the multi-step method has a better chance for being put into mass production. However, the multi-step method suffers several drawbacks such as a relatively easy agglomeration of nanoparticles and rapid sedimentation of the nanoparticles in the fluid, which cause the nanofluid so produced having a poorer stability.

The recent research on application of a rotating packed bed is rather helpful in finding a solution to the problems which can not be easily resolved in the normal gravity field. The mass transfer process is greatly enhanced by the rotating packed bed in such a way that a 2-meter rotating packed bed can be used in place of a 10-meter packed column, and that the rotating packed bed is exceptionally effective in bringing about an absorption process, a stripping process, or a distillation process, as exemplified by the disclosures of the U.S. Pat. Nos. 4,283,255; 4,382,045; 4,382,900; and 4,400,275. In addition, the Chinese patent publication No. CN1116146A (1996) discloses a process for making ultrafine granule by using the mass transfer equipment in such a manner that a multiphase material flow is fed into the axial position of a rotating packed bed via a distributor from a tubular structure formed of two concentric sleeves. Under the effect of a high gravity field, the material flow comes in contact with the rotating packed bed. Such a technique as described above is relatively new and is still under further investigation. To the best of knowledge of these inventors of the present invention, no prior art dealing with the application of the rotating packed bed to the preparation of nanofluids has ever been disclosed. Details of the disclosures in the above-mentioned patents are incorporated herein by referenced.

SUMMARY OF THE INVENTION

A primary objective of the present invention is to provide a process for preparing a nanofluid by an one-step method.

Another objective of the present invention is to provide a process for preparing a nanofluid by an one-step method, wherein metal oxide nanoparticles can stably dispersed in the nanofluid.

In order to accomplished the above objectives, a process for preparing a hydrophobic fluid having metal oxide nanoparticles dispersed therein disclosed in the present invention comprises introducing an alkaline aqueous solution of aqueous phase and an organic solution of organic acid metal salt of hydrophobic phase into a rotating packed bed rotating around an axis, said rotating packed bed being located in a housing, so that the two solutions of the aqueous phase and the hydrophobic phase flow radially through a packing of said rotating packed bed in a direction away from said axis under a centrifugal force and contact with each other while flowing through the packing, so that a base in the aqueous phase and the organic acid metal salt in the hydrophobic phase undergo reactions at the interface of the two phases, and thus metal oxide nanoparticles are formed.

Preferably, the process of the present invention further comprises collecting a two-layer liquid comprising an aqueous phase and a hydrophobic phase at a bottom of the housing; and separating the hydrophobic phase of the two-layer liquid from the aqueous of the two-layer liquid to obtain a hydrophobic fluid containing the metal oxide nanoparticles dispersed therein.

Preferably, the process of the present invention further comprises mixing the hydrophobic fluid with an oily fluid stock; and removing at least a portion of the organic solvent from the resulting mixture fluid by evaporation or distillation to obtain an oily fluid with metal oxide nanoparticles dispersed therein.

Preferably, the process of the present invention further comprises removing at least a portion of the organic solvent from the hydrophobic fluid by evaporation or distillation to obtain a concentrated hydrophobic fluid. More preferably, the process of the present invention further comprises mixing the concentrated hydrophobic fluid with an oily fluid stock; and removing a portion of the organic solvent from the resulting mixture fluid by evaporation or distillation to obtain an oily fluid with metal oxide nanoparticles dispersed therein.

Preferably, the oily fluid with metal oxide nanoparticles dispersed therein is used as a heat transfer fluid or a lubricant oil.

Preferably, the organic solution is formed by dissolving the organic acid metal salt in an organic solvent of a hydrocarbon having a carbon atom number of 7 to 32 or a fluorinated hydrocarbon. More preferably, the hydrocarbon is an alkane, alkene, or alkyne. Most preferably, the hydrocarbon is an alkane.

Preferably, the organic acid metal salt is a carboxylic acid metal salt having the formula of $[RCOO^-]_z M^{z+}$, wherein R is a hydrophobic group of a saturated or unsaturated hydrocarbon having a carbon atom number of 7 to 32 or a saturated or unsaturated hydrocarbon having a carbon atom number of 7 to 32 and one or two hydroxyl radicals; M is a metal and z is the valence of the metal. More preferably, R is a hydrophobic group of a saturated or unsaturated hydrocarbon having a carbon atom number of 11 to 23; and M is Cu, Zn, Fe, Al, Zr or Ag.

Preferably, the organic acid metal salt is copper oleate, copper abietate, copper ethylacetoacetate, copper naphthenate, copper octoate, copper resinate, copper ricinoleate, copper stearate, zinc oleate, zinc ethylacetoacetate, zinc octoate, zinc 2-ethylhexoate, zinc laurate, zinc linoleate, zinc palmitate, zinc ricinoleate, zinc stearate, zinc undecylenate, ferric octoate, ferric oleate, ferric resinate, ferric stearate, ferric 2-ethylhexoate, ferrous, ferrous stearate, or ferrous octoate.

Preferably, the alkaline aqueous solution is formed by dissolving an inorganic base or an organic base in water.

Preferably, the alkaline aqueous solution is an aqueous solution of an alkali metal hydroxide.

Preferably, the alkaline aqueous solution has a temperature of room temperature to 100° C., and the organic solution has a temperature of room temperature to a boiling point of an organic solvent of the organic solution.

Preferably, the alkaline aqueous solution and the organic solution are introduced into the rotating packed bed via an axial area of the rotating packed bed.

Preferably, said rotating pack bed comprises a central channel region around said axis and an annular packed region surrounding said central channel region, said annular packed region being packed with said packing, and said annular packed region and said central channel region being in fluid communication only through a boundary thereof, and said annular packed region and said housing being in fluid communication only through an outer circumference of said annular packed region.

Preferably, the metal oxide nanoparticles have a size of 1 to 100 nanometers.

The process of the present invention solves the dispersion problem of nanoparticles in the hydrophobic fluid by using a hydrophobic group in the organic acid metal salt, and utilizes the structure of the rotating packed bed for undergoing the reactions between the aqueous phase and the hydrophobic phase, thereby accomplishing an one-step method to synthesize nanoparticles and well disperse the nanoparticles in the hydrophobic fluid. Moreover, the process of the present invention enjoys the advantages of high mass transfer and an interfacial reactions at the two phases, and thus can be used to very efficiently prepare a nanofluid with a superior dispersion property at a high production rate. Therefore, the process of the present invention has a great potential to be put into mass production.

DETAILED DESCRIPTION OF THE INVENTION

Figure 1:
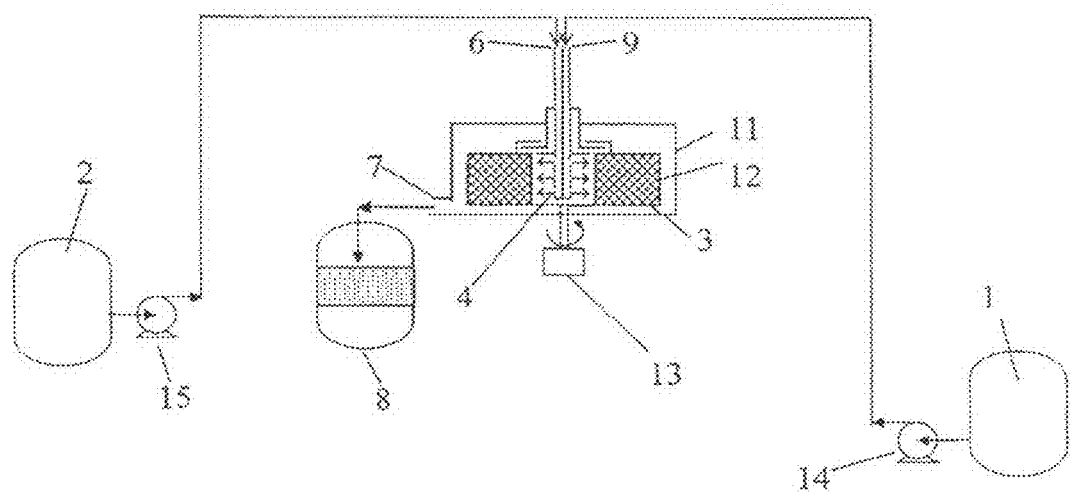
FIG. 1 is a schematic flowchart showing a preferred embodiment of the process of the present invention.

In the following text the present invention will be described by a preferred embodiment in conjunction with the accompanying drawings. A rotating packed bed reactor suitable for use in the present invention is shown in FIG. 1, which includes a rotating packed bed mounted a housing 11. The rotating packed bed 3 has an annular pack region 12, and the annular pack region 12 is packed with a packing.

An alkaline aqueous solution is kept in a liquid tank 1, from which the alkaline aqueous solution is pumped by a pump 14 into an axial area of the rotating packed bed via a liquid inlet 9. Simultaneously, an organic solution of an organic acid metal salt is pumped by a pump 15 from another liquid tank 2 into the axial area of the rotating packed bed via another liquid inlet 6. By means of another liquid distributor 4, the organic solution entering the liquid inlet 6 is uniformly sprayed toward the annular pack region 12. The two solution are caused to rapidly move outward by an enormous centrifugal force which is generated by a variable motor 13. As a result, more minute liquid droplets are created, when the two solutions pass the packing of the annular pack region 12. At the same time, the minute liquid droplets contact with each other, so that a base in the aqueous solution and the organic acid metal salt in the organic solution undergo reactions at the interface of the two phases, and thus metal oxide nanoparticles are formed. The resulting reaction product will hit the housing 11 and will be collected at the bottom of the housing 11 prior to being discharged via a liquid outlet 7 to a collection tank 8. In the collection tank 8, the resulting reaction product will form a two-layer liquid, and the metal oxide nanoparticles are dispersed in the hydrophobic phase. By decantation or other suitable method the two-layer liquid is separated into the aqueous phase, and the hydrophobic phase with metal oxide nanoparticles are dispersed therein (a hydrophobic fluid).

The features and the advantages of the method of the present invention will be more readily understood upon a thoughtful deliberation of the following nonrestrictive examples.

Example 1

Preparation of Hydrophobic Fluid with Copper Oxide Nanoparticles Dispersed Therein The specification of the rotating packed bed used in this example are listed in the following:

| Packing | Stainless steel wires having a diameter of 0.22 mm |
|---|---|
| Specific surface area of packing | 603 m$^2$/m$^3$ |
| Voidage of packed bed | 96.7% |
| Inner radius of annular packed bed | 6.1 cm |
| Outer radius of annular packed bed | 14.7 cm |
| Axial height of annular packed bed | 9.5 cm |

Figure 2:
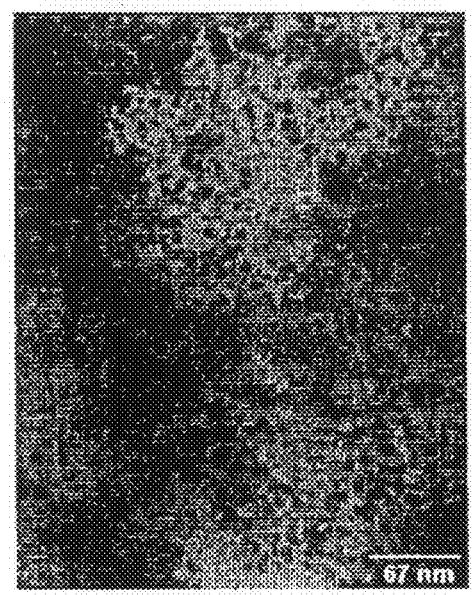
FIG. 2 is a transmission electron microscopy (TEM) photo showing copper oxide nanoparticles in a nanofluid prepared in Example 1 of the present invention.

$(C_{17}H_{33}COO)_2Cu$ and NaOH were dissolved in n-octane and water separately to form an organic solution and an aqueous solution with a concentration of 0.1 mol/L and 0.2 mol/L, respectively, which were stored in two different tanks and heated to 90° C. or higher. The two solutions were pumped simultaneously at a flow rate of 0.1 L/min into the rotating packed bed at 1800 rpm. The rotating packed bed was heated and maintained at a temperature of 90° C., and a pressure of 1 atm. The product was collected at a bottom of the housing and placed still into a two-layer liquid. The upper layer of hydrophobic phase was separated from the two-layer liquid as a hydrophobic fluid containing copper oxide nanoparticles dispersed therein. The copper oxide nanoparticles in the hydrophobic fluid are shown in the TEM photo of FIG. 2.

Figure 3:
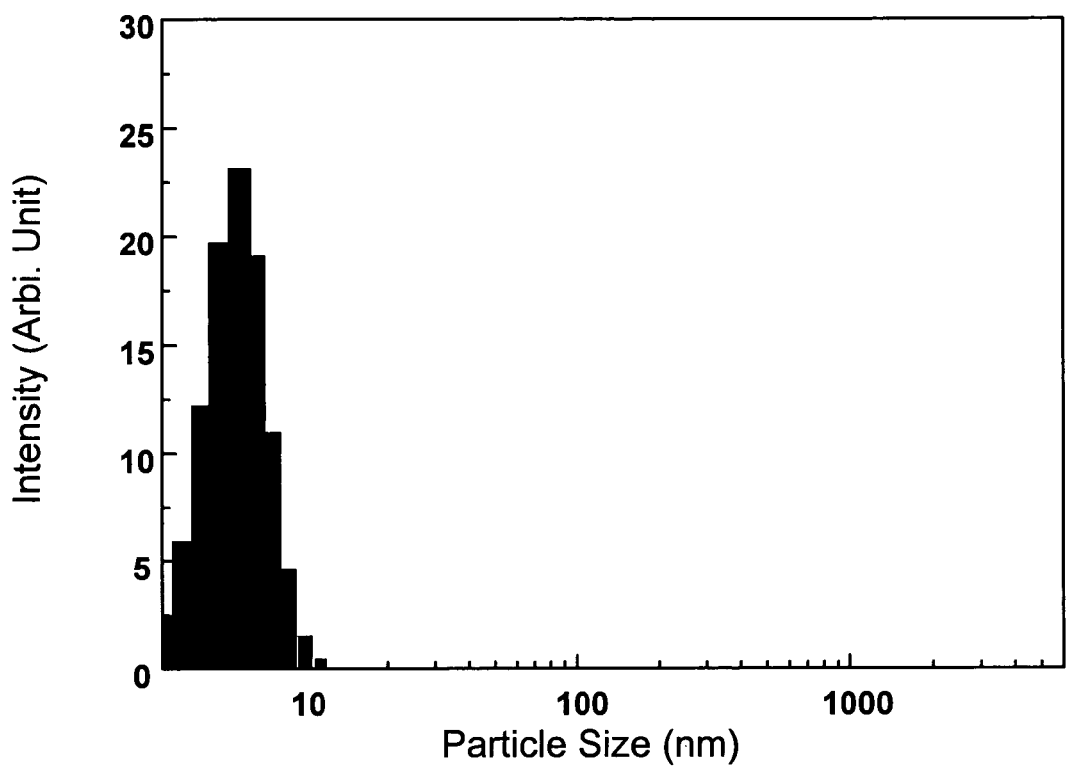
FIG. 3 is a particle size distribution plot of the copper oxide nanoparticles in a nanofluid prepared in Example 1 of the present invention.

The particle size distribution of the copper oxide nanoparticles in the hydrophobic fluid were measured by the light scattering method, and the results are shown in FIG. 3. It can be seen from FIGS. 2 and 3 that a major portion of the copper oxide nanoparticles in the hydrophobic fluid prepared in this example have a size less than 10 nm.

The above procedures were repeated except that the n-octane was replaced with n-dodecane and the temperatures was changed from 90° C. to 120° C. A hydrophobic fluid containing copper oxide nanoparticles dispersed therein was also successfully prepared after the modifications.

A heat transfer coefficient of the two hydrophobic fluids containing 2 wt % copper oxide nanoparticles dispersed therein prepared in this example were measured with a hot-plate type heat transfer coefficient measuring equipment (H471, P. A. Hilton Ltd., UK). The results show that the two hydrophobic fluids containing 2 wt % copper oxide nanoparticles dispersed therein prepared in this example have a heat transfer coefficient at least 10% higher than those of n-octane and n-dodecane.

The two hydrophobic fluids containing copper oxide nanoparticles dispersed therein prepared in this example were subjected to a distillation treatment under a reduced pressure, so that a portion of the organic solvents were removed, and two concentrated hydrophobic fluid containing 10 wt % or higher copper oxide nanoparticles well dispersed therein were formed.

Example 2

Figure 4:
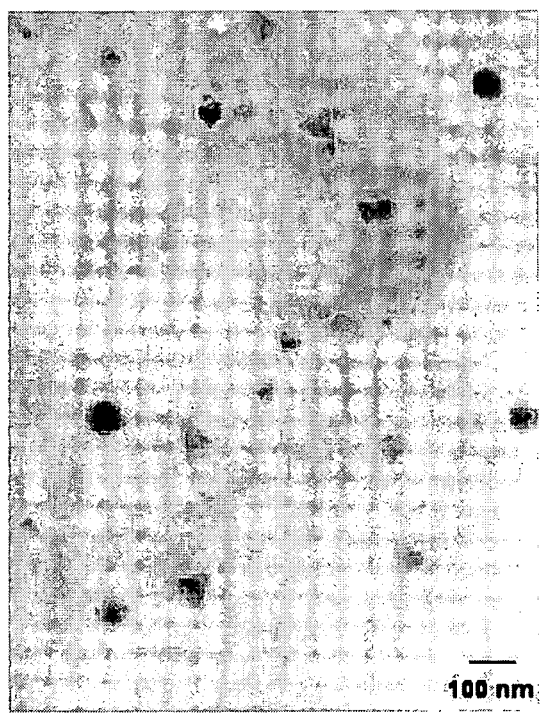
FIG. 4 is a TEM photo showing zinc oxide nanoparticles in a nanofluid prepared in Example 2 of the present invention.

Preparation of Hydrophobic Fluid with Zinc Oxide Nanoparticles Dispersed Therein $(C_{17}H_{33}COO)_2Zn$ and $(C_{17}H_{31}COO)_2Zn$ were separately dissolved in n-octane to form two organic solutions with concentrations of 0.25 mol/L and 0.5 mol/L, respectively. These two organic solutions were reacted with an aqueous solution of NaOH (0.15 mol/L) by using the rotating packed bed in Example 1. The temperatures of the organic solution and the NaOH aqueous solution were 100° C. and 90° C., respectively. The flow rates of the organic solution and the NaOH aqueous solution introduced into the rotating packed bed were both 0.1 L/min, which was driven at 1800 rpm and maintained at a temperature of 100° C. and a pressure of 1 atm. Similar to Example 1, two hydrophobic fluids containing zinc oxide nanoparticles dispersed therein were successfully prepared in this example. The zinc oxide nanoparticles in the hydrophobic fluid are shown in the TEM photo of FIG. 4. It can be seen from FIG. 4 that a major portion of the zinc oxide nanoparticles in the hydrophobic fluid prepared in this example have a size less than 40 nm and in various forms including triangle, and sphere.

Example 3

Preparation of Hydrophobic Fluid with Iron Oxide Nanoparticles Dispersed Therein Preparation of $(C_{17}H_{33}COO)_3Fe$ $C_{17}H_{33}COONa$ aqueous solution (0.05 mol/L) and $FeCl_3$ (or $Fe_2(SO_4)_3$ aqueous solution (0.08 mol/L)) were mixed in a molar ratio of $C_{17}H_{33}COO:Fe^{3+}=3:1$ to form a precipitate. A red brown solid of $(C_{17}H_{33}COO)_3Fe$ was obtained after recovering the precipitate by filtration, washing and drying the precipitate.

Preparation of $Fe_2O_3$ Nanoparticles Fluid $(C_{17}H_{33}COO)_3Fe$ and NaOH were separately dissolved in n-octane and water to form an organic solution and an aqueous solution with concentrations of 0.15 mol/L and 0.5 mol/L, respectively. The organic solution was reacted with the aqueous solution by using the rotating packed bed in Example 1. The temperatures of the organic solution and the NaOH aqueous solution were both 70° C. The flow rates of the organic solution and the NaOH aqueous solution introduced into the rotating packed bed were both 0.1 L/min, which was driven at 1800 rpm and maintained at a temperature of 70° C. and a pressure of 1 atm. Similar to Example 1, a hydrophobic fluid containing iron oxide nanoparticles dispersed therein was successfully prepared in this example.

The hydrophobic fluid containing iron oxide nanoparticles dispersed therein prepared in this example was subjected to a distillation treatment under a reduced pressure, so that a portion of the organic solvent was removed, and a concentrated hydrophobic fluid containing a higher content of iron oxide nanoparticles well dispersed therein was formed.

Example 4

Preparation of Hydrophobic Fluid with Magnetic Iron Oxide Nanoparticles Dispersed Therein $(C_{17}H_{35}COO)_2Fe$ and NaOH were separately dissolved in n-octane and water to form an organic solution and an aqueous solution with concentrations of 0.02 mol/L and 0.4 mol/L, respectively. The organic solution was reacted with the aqueous solution by using the rotating packed bed in Example 1. The temperatures of the organic solution and the NaOH aqueous solution were both 40° C. The flow rates of the organic solution and the NaOH aqueous solution introduced into the rotating packed bed were both 0.1 L/min, which was driven at 1800 rpm and maintained at a temperature of 40° C. and a pressure of 1 atm. Similar to Example 1, a hydrophobic fluid containing magnetic iron oxide nanoparticles dispersed therein was successfully prepared in this example.

The hydrophobic fluid containing magnetic iron oxide nanoparticles dispersed therein prepared in this example was subjected to a distillation treatment under a reduced pressure, so that a portion of the organic solvent was removed, and a concentrated hydrophobic fluid containing a higher content of iron oxide nanoparticles well dispersed therein was formed.

Example 5

Preparation of Nano-Lubricant Oil

The hydrophobic fluid prepared in the present invention was used to prepare a nano-lubricant oil indirectly, wherein the hydrophobic fluid was mixed with a lubricant oil, and the organic solvent in the hydrophobic fluid was removed by a vacuum distillation, thereby the metal oxide nanoparticles were transferred into the lubricant oil without scarifying the dispersion stability.

400 mL of the hydrophobic fluid containing 0.5-1 wt % of copper oxide nanoparticles prepared in Example 1 was mixed with 100 mL of a commercially available lubricant oil (Mobil SuperSyn 5W-50), and the agitated with a stirrer. The copper oxide nanoparticles were well dispersed in the resulting mixture fluid, and the dispersion stability was not adversely affected by the mixing. The resulting mixture fluid was subjected to a vacuum distillation (60° C., 35 Torr) to remove the n-octane solvent, and a nano-lubricant oil having about 5 wt % of copper oxide nanoparticles was obtained. The copper oxide nanoparticles were well dispersed in the nano-lubricant oil without sedimentation after 6-month storage.

Test on Dispersion at Elevated Temperature for Nano-Lubricant Oil

The nano-lubricant oil so prepared was heated to 200° C. a rate of 20° C./min, and was maintained at that temperature for one hour. After cooling, the color and the sedimentation of the nano-lubricant oil were observed. The results indicate that no significant changes in the nano-lubricant oil. This test was repeated three times. The results show that the appearance and the dispersion property of the tested nano-lubricant oil are not affected by the elevated temperature, indicating a stable dispersion at elevated temperature operations.

Although particular embodiments of the invention have been described, various alternations, modifications, and improvements will readily occur to those skilled in the art. Accordingly, the forgoing description is by way of example only and is not intended as limiting. This invention is limited only as defined in the following claims and the equivalents thereto.

The invention claimed is:

1. A process for preparing a hydrophobic fluid containing metal oxide nanoparticles dispersed therein, which comprises introducing an alkaline aqueous solution of aqueous phase and an organic solution of organic acid metal salt of hydrophobic phase into a rotating packed bed rotating around an axis, said rotating packed bed being located in a housing, so that the two solutions of the aqueous phase and the hydrophobic phase flow radially through a packing of said rotating packed bed in a direction away from said axis under a centrifugal force and contact with each other while flowing through the packing, so that a base in the aqueous phase and the organic acid metal salt in the hydrophobic phase undergo reactions at the interface of the two phases, and thus metal oxide nanoparticles are formed.

2. The process as defined in claim 1 further comprising collecting a two-layer liquid comprising an aqueous phase and a hydrophobic phase at a bottom of the housing; and separating the hydrophobic phase of the two-layer liquid from the aqueous of the two-layer liquid to obtain a hydrophobic fluid containing the metal oxide nanoparticles dispersed therein.

3. The process as defined in claim 2 further comprising removing at least a portion of an organic solvent from the hydrophobic fluid by evaporation or distillation to obtain a concentrated hydrophobic fluid.

4. The process as defined in claim 3 further comprising mixing the concentrated hydrophobic fluid with an oily fluid stock; and removing a portion of an organic solvent from the resulting mixture fluid by evaporation or distillation to obtain an oily fluid with metal oxide nanoparticles dispersed therein.

5. The process as defined in claim 2 further comprising mixing the hydrophobic fluid with an oily fluid stock; and removing at least a portion of an organic solvent from the resulting mixture fluid by evaporation or distillation to obtain an oily fluid with metal oxide nanoparticles dispersed therein.

6. The process as defined in claim 1, wherein the organic solution is formed by dissolving the organic acid metal salt in an organic solvent of a hydrocarbon having a carbon atom number of 7 to 32 or a fluorinated hydrocarbon.

7. The process as defined in claim 6, wherein the hydrocarbon is an alkane, alkene, or alkyne.

8. The process as defined in claim 7, wherein the hydrocarbon is an alkane.

9. The process as defined in claim 1, wherein the organic acid metal salt is a carboxylic acid metal salt having the formula of $[RCOO^-]_z M^{z+}$, wherein R is saturated or unsaturated hydrocarbon having a carbon atom number of 7 to 32, or a hydroxyl-substituted saturated or unsaturated hydrocarbon having a carbon atom number of 7 to 32 and one or two hydroxyl radicals; M is a metal and z is the valence of the metal.

10. The process as defined in claim 9, wherein R is a hydrophobic group of a saturated or unsaturated hydrocarbon having a carbon atom number of 11 to 23; and M is Cu, Zn, Fe, Al, Zr or Ag.

11. The process as defined in claim 1, wherein the organic acid metal salt is copper oleate, copper abietate, copper ethylacetoacetate, copper naphthenate, copper octoate, copper resinate, copper ricinoleate, copper stearate, zinc oleate, zinc ethylacetoacetate, zinc octoate, zinc 2-ethylhexoate, zinc laurate, zinc linoleate, zinc palmitate, zinc ricinoleate, zinc stearate, zinc undecylenate, ferric octoate, ferric oleate, ferric resinate, ferric stearate, ferric 2-ethylhexoate, ferrous, ferrous stearate, or ferrous octoate.

12. The process as defined in claim 1, wherein the alkaline aqueous solution is formed by dissolving an inorganic base or an organic base in water.

13. The process as defined in claim 1, wherein the alkaline aqueous solution is an aqueous solution of an alkali metal hydroxide.

14. The process as defined in claim 1, wherein the alkaline aqueous solution has a temperature of room temperature to 100° C., and the organic solution has a temperature of room temperature to a boiling point of an organic solvent of the organic solution.

15. The process as defined in claim 1, wherein the alkaline aqueous solution and the organic solution are introduced into the rotating packed bed via said axis.

16. The process as defined in claim 1, wherein said rotating pack bed comprises a central channel region around said axis and an annular packed region surrounding said central channel region, said annular packed region being packed with said packing, and said annular packed region and said central channel region being in fluid communication only through a boundary thereof, and said annular packed region and said housing being in fluid communication only through an outer circumference of said annular packed region.

17. The process as defined in claim 1, wherein the metal oxide nanoparticles have a size of 1 to 100 nanometers.

* * * * *

UNITED STATES PATENT AND TRADEMARK OFFICE
CERTIFICATE OF CORRECTION

PATENT NO.       : 7,649,024 B2                                                Page 1 of 1
APPLICATION NO.  : 11/221811
DATED            : January 19, 2010
INVENTOR(S)      : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1167 days.

Signed and Sealed this

Twenty-eighth Day of December, 2010

David J. Kappos
*Director of the United States Patent and Trademark Office*